US008097225B2

(12) United States Patent
Padmanabhan et al.

(10) Patent No.: US 8,097,225 B2
(45) Date of Patent: Jan. 17, 2012

(54) MICROFLUIDIC CARTRIDGE WITH RESERVOIRS FOR INCREASED SHELF LIFE OF INSTALLED REAGENTS

(75) Inventors: Aravind Padmanabhan, Plymouth, MN (US); Cleopatra Cabuz, Edina, MN (US); Kenneth O. MacFadden, Chestertown, MD (US)

(73) Assignee: Honeywell International Inc., Morristown, NJ (US)

( * ) Notice: Subject to any disclaimer, the term of this patent is extended or adjusted under 35 U.S.C. 154(b) by 1057 days.

(21) Appl. No.: 10/900,887

(22) Filed: Jul. 28, 2004

(65) Prior Publication Data

US 2006/0023039 A1 Feb. 2, 2006

(51) Int. Cl.
*G01N 21/00* (2006.01)

(52) U.S. Cl. ........................................................ 422/554

(58) Field of Classification Search .................... 422/58, 422/554

See application file for complete search history.

(56) References Cited

U.S. PATENT DOCUMENTS

| | | | | |
|---|---|---|---|---|
| 3,918,435 | A | 11/1975 | Beall et al. | |
| 4,548,693 | A * | 10/1985 | Kadija et al. | 204/252 |
| 4,586,604 | A | 5/1986 | Alter | |
| 4,803,998 | A | 2/1989 | Kezes et al. | |
| 4,813,432 | A | 3/1989 | Saint-Amand | |
| 4,822,461 | A | 4/1989 | Brattan et al. | |
| 4,978,504 | A | 12/1990 | Nason | |
| 5,266,266 | A | 11/1993 | Nason | |
| 5,425,921 | A | 6/1995 | Coakley et al. | |
| 5,639,428 | A * | 6/1997 | Cottingham | 422/112 |
| 6,003,981 | A | 12/1999 | Cameron et al. | |
| 6,090,081 | A | 7/2000 | Sudo et al. | |
| 6,245,518 | B1 | 6/2001 | Baier | |
| 6,268,210 | B1 | 7/2001 | Baier et al. | |
| 6,329,139 | B1 | 12/2001 | Nova et al. | |
| 6,382,228 | B1 | 5/2002 | Cabuz et al. | |
| 6,382,784 | B2 | 5/2002 | Pawlowski, Jr. et al. | |
| 6,492,295 | B2 | 12/2002 | Hitomi et al. | |
| 6,498,497 | B1 | 12/2002 | Chow et al. | |
| 6,500,295 | B1 | 12/2002 | Kubota | |
| 6,524,282 | B1 | 2/2003 | Sudo et al. | |
| 6,555,190 | B1 | 4/2003 | Tsai | |

(Continued)

FOREIGN PATENT DOCUMENTS

EP 1486455 12/2004

OTHER PUBLICATIONS

Eurodyne.co.uk—The Fluidic Handling Specialists, 1 page, printed Sep. 2, 2003. http://www.eurodyne.co.uk/4195/5234.html.

(Continued)

*Primary Examiner* — Lore Jarrett
(74) *Attorney, Agent, or Firm* — Seager, Tufte & Wickhem LLC

(57) ABSTRACT

A microfluidic cartridge that includes at least one reservoir for storing a reagent or the like for an extended period of time. In one illustrative embodiment, at least part of a wall of a reservoir includes a hydrophobic material, such as a polymonochlorotrifluoroethylene (PCTFE) homopolymer and/or copolymer. The hydrophobic material may help reduce leaching, evaporation, diffusion and/or other transfer of the reagent or one of its components from the reservoir. When the reagent or the like is lyophilized, the hydrophobic material may help keep water, water vapor and/or other gases or liquids from entering the reservoir prior to use of the microfluidic cartridge.

3 Claims, 3 Drawing Sheets

U.S. PATENT DOCUMENTS

| | | | |
|---|---|---|---|
| 6,582,662 | B1 | 6/2003 | Kellogg et al. |
| 6,597,438 | B1 | 7/2003 | Cabuz et al. |
| 6,603,654 | B2 | 8/2003 | Rorvick et al. |
| 6,700,130 | B2 | 3/2004 | Fritz |
| 6,970,245 | B2 | 11/2005 | Fritz et al. |
| 7,215,425 | B2 | 5/2007 | Rezachek et al. |
| 7,262,838 | B2 | 8/2007 | Fritz |
| 7,283,223 | B2 | 10/2007 | Fritz |
| 7,312,870 | B2 | 12/2007 | Fritz et al. |
| 7,471,394 | B2 | 12/2008 | Padmanabhan et al. |
| 7,497,997 | B2 | 3/2009 | Glezer et al. |
| 2002/0018512 | A1 | 2/2002 | Hehenberger et al. |
| 2002/0039677 | A1 | 4/2002 | Iwamoto et al. |
| 2002/0118362 | A1 | 8/2002 | Saccomanno |
| 2002/0173040 | A1 | 11/2002 | Potyrailo et al. |
| 2002/0197656 | A1 | 12/2002 | Li et al. |
| 2003/0040129 | A1 * | 2/2003 | Shah ............................ 436/526 |
| 2003/0060747 | A1 | 3/2003 | Fries et al. |
| 2003/0107467 | A1 | 6/2003 | Bonne |
| 2003/0136403 | A1 | 7/2003 | Frye et al. |
| 2003/0147770 | A1 | 8/2003 | Brown et al. |
| 2004/0001767 | A1 * | 1/2004 | Peters et al. ............... 417/413.2 |
| 2004/0211077 | A1 | 10/2004 | Schwichtenberg et al. |
| 2004/0241042 | A1 | 12/2004 | Pugia et al. |
| 2005/0022594 | A1 | 2/2005 | Padmanabhan et al. |
| 2005/0078299 | A1 | 4/2005 | Fritz et al. |
| 2005/0105077 | A1 | 5/2005 | Padmanabhan |
| 2005/0122522 | A1 | 6/2005 | Padmanabhan |
| 2005/0180891 | A1 * | 8/2005 | Webster et al. ............... 422/100 |
| 2005/0191212 | A1 * | 9/2005 | Antocci et al. ............... 422/68.1 |
| 2006/0066840 | A1 | 3/2006 | Fritz |
| 2007/0172388 | A1 | 7/2007 | Padmanabhan et al. |
| 2007/0188737 | A1 | 8/2007 | Fritz |
| 2007/0190525 | A1 | 8/2007 | Gu et al. |
| 2008/0124805 | A1 | 5/2008 | Cox |
| 2008/0195020 | A1 | 8/2008 | Cabuz |

OTHER PUBLICATIONS

Honeywell ACLAR PCTFE Moisture Barrier Film, 1 page, printed Sep. 2, 2003. http://www.aclar.com/apps/medical.html.

Honeywell ACLAR PCTFE Moisture Barrier Film, 1 page, printed Sep. 2, 2003. http://www.aclar.com/tech/lamination.html.

Honeywell ACLAR PCTFE Moisture Barrier Film, 2 pages, printed Sep. 2, 2003. http://www.aclar.com.

Honeywell ACLAR PCTFE Moisture Barrier Film, 2 pages, printed. Sep. 2, 2003. http://www.aclar.com/apps/healthcare.html.

Honeywell ACLAR PCTFE Moisture Barrier Film, 3 pages, printed Sep. 2, 2003. http://www.aclar.com/tech/general.html.

Scivex OEM Capabilities, Upchurch Scientific, pp. 109-115, prior to filing date of present application.

Transactions in Measurement and Control , Volume 4—Flow & Level Management, pp. 4-105, prior to filing date of present application.

* cited by examiner

MICROFLUIDIC CARTRIDGE WITH RESERVOIRS FOR INCREASED SHELF LIFE OF INSTALLED REAGENTS

FIELD OF THE INVENTION

The present invention relates generally to microfluidic cartridges, and more particularly to microfluidic cartridges that include one or more reservoirs for storing one or more substances such as reagents for a period of time.

BACKGROUND OF THE INVENTION

There has been a growing interest in the manufacture and use of microfluidic systems for the acquisition of chemical and biological information. Microfluidic systems include devices with features having dimensions on the order of nanometers to 100s of microns, which cooperate to perform various desired functions. For example, micro fluidic devices can be adapted to perform material analysis and manipulation functions, such as chemical, biological and/or physical analyses. Many microfluidic systems have the advantages of increased response time, smaller required sample volumes, and lower reagent consumption. When hazardous materials are used or generated, performing reactions in microfluidic volumes may also enhance safety and reduces disposal quantities.

In some cases, microfluidic cartridges are used in conjunction with a cartridge reader. The cartridge reader may, for example, provide support functions to the microfluidic cartridge. In some cases, for example, the cartridge reader may provide electrical control signals, light beams and/or light detectors, pneumatic control flows, electric flow drive fields, signal processing, and/or other support functions.

In some microfluidic cartridges, on board reservoirs are provided for storing reagents or the like that are used to perform the desired material analysis and/or manipulation functions, such as chemical, biological and/or physical analyses. In many cases, these reservoirs are not adapted to store reagents or the like for an extended period of time. As such, the reagents or the like must be loaded into the reservoirs just prior to use of the cartridge to ensure accurate results. In many applications, however, it would be desirable to load the reagents or the like into at least some of the reservoirs well before the microfluidic cartridge is actually used. This may, for example, allow more precise control over the quality and quantity of the reagents in the reservoirs, as well as an increase in the ease of use of the microfluidic cartridge in the field.

SUMMARY OF THE INVENTION

The present invention is directed toward a microfluidic cartridge that includes at least one reservoir for storing a reagent or the like for an extended period of time. In one illustrative embodiment, at least part of a wall of the reservoir includes a hydrophobic material, such as a polymonochlorotrifluoroethylene (PCTFE) homopolymer and/or copolymer, as desired. The hydrophobic material may help reduce leaching, evaporation, diffusion and/or other transfer of the reagent or one of its components from the reservoir. When the reagent or the like is lyophilized, the hydrophobic material may help keep water, water vapor and/or other gases or liquids from entering the reservoir prior to use of the microfluidic cartridge.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION

Figure 1:
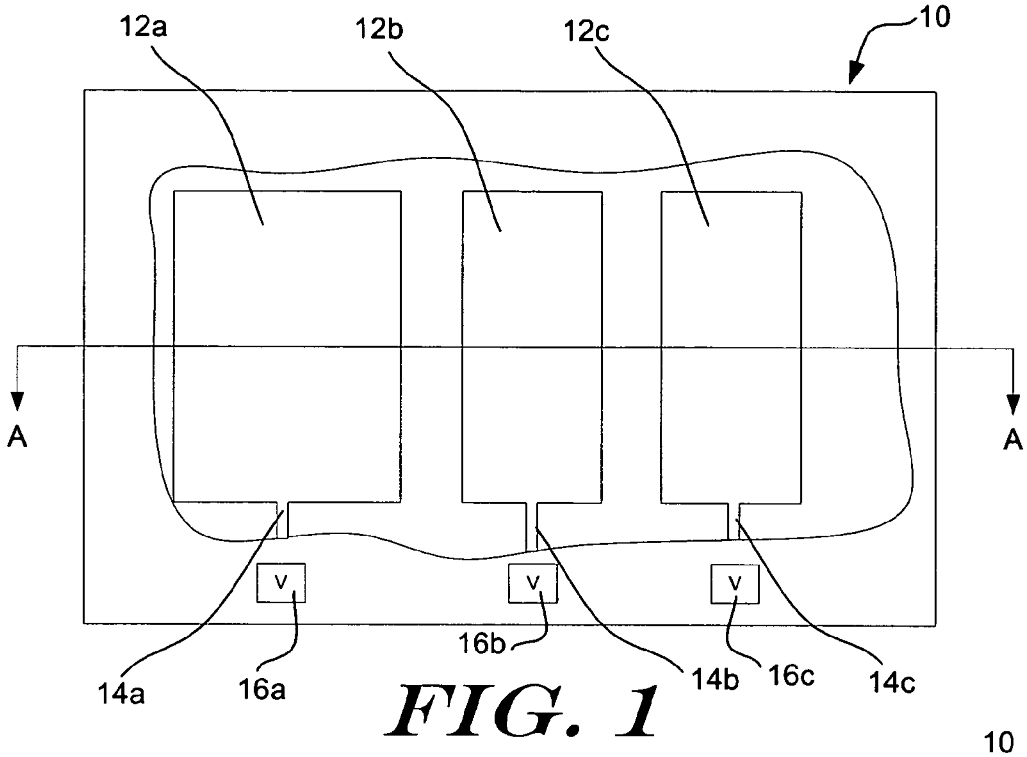
FIG. 1 is a schematic top view of an illustrative microfluidic cartridge in accordance with the present invention.

FIG. 1 is a schematic top view of a microfluidic cartridge in accordance with the present invention. It should be understood that the microfluidic cartridge shown generally at 10 is only illustrative, and that the present invention can be applied to any microfluidic cartridge regardless of form, function or configuration. For example, the microfluidic cartridge may be used for hematology, flow cytometry, clinical chemistry, electrolyte measurements, etc. It is also contemplated that the illustrative microfluidic cartridge 10 may be made from any suitable material or material system including, for example, glass, silicon, one or more polymers, or any other suitable material or material system, or combination of materials or material systems.

The illustrative microfluidic cartridge 10 includes three reservoirs 12*a*, 12*b*, and 12*c*. At least one of the reservoirs 12*a*, 12*b* and 12*c* is adapted to accept and store a substance or material, such as a sample, a reagent, or the like, depending on the application. The sample may be, for example, a blood sample. The reagent may be, for example, a lysing agent, a sheath fluid or any other suitable reagent or substance in liquid, gas or solid form, as desired.

In some illustrative embodiments, one or more of the reservoirs 12*a*, 12*b* and 12*c* may store a fluid, such as a buffer fluid, a reagent fluid, a lyse fluid, a sphering fluid, a diluent, a sheathing fluid, a fluorescent dye, a cytochemical stain, a detergent, a monoclonal antibody, a monoclonal antibody with an attached fluorescent dye, a phosphate buffered saline, an electrolyte solution, an enzymatic cleanser and/or a sample fluid to be analyzed.

In some cases, the sphering fluid may be, for example, a sphering reagent that is adapted to sphere red blood cells. The detergent fluid may be, for example, a detergent III and/or a detergent IIIA, which may be a balanced electrolyte solution for use as a rinsing and hemoglobin blanking diluent. The diluent may be, for example, a balanced electrolyte solution for use as a diluent for blood cell counting and/or sizing. The lyse fluid may be, for example, a fluid that can help make a simultaneous quantitative determination of hemoglobin and white blood cells. The lyse fluid may also be, for example, a hemoglobin/lyse for the quantitative determination of hemoglobin. The enzymatic cleanser may be, for example, a concentrated enzymatic cleanser manufactured for automated and semi-automated hematology instruments. The electrolyte solution may be, for example, a balanced electrolyte solution for use as a diluent for blood cell counting and/or sizing. These are just some example fluids 10 that are suitable for use with the present invention.

In the illustrative embodiment, each reservoir 12*a*, 12*b* and 12*c* includes a channel 14*a*, 14*b* and 14*c*, respectively. The channels 14*a*, 14*b* and 14*c* may be used to deliver the sample, reagent, and/or any other suitable substance from the corresponding reservoirs 12*a*, 12*b* and 12*c* to a fluidic circuit (not explicitly shown) on the microfluidic cartridge 10. The fluidic circuit may be used to perform, for example, desired material analysis and/or manipulation functions, such as chemical, biological and/or physical analyses, including in some cases, cytometry. In some cases, and as shown in the illustrative embodiment of FIG. 1, one or more valves 16*a*, 16*b* and 16*c* may also be provided to help control the flow from at least some of the reservoir 12*a*, 12*b* and 12*c* to various parts of the fluidic circuit.

In accordance with the illustrative embodiment, one or more of the reservoirs 12*a*, 12*b* and 12*c* may be adapted to store a reagent or other substance for an extended period of time. This may help increase the shelf life of the microfluidic cartridge. In one illustrative embodiment, at least part of a wall of at least one of the reservoirs 12*a*, 12*b* and 12*c* includes a hydrophobic material, such as a polymonochlorotrifluoroethylene (PCTFE) homopolymer and/or copolymer. The hydrophobic material may help reduce leaching, evaporation, diffusion and/or other transfer of the reagent or other substance, one of its components, from the reservoir. When the reagent or other substance is lyophilized, the hydrophobic material may help keep water, water vapor and/or other gases or liquids from entering the reservoir prior to use of the microfluidic cartridge. The lyophilized substance may be hydrated prior to use by, for example, providing a hydrating fluid into the reservoir via a channel or the like. The hydrating fluid may be stored in another reservoir, if desired. In some cases, the lyophilized substance and hydrating fluid may be mixed once the hydrating fluid is transported to the reservoir that includes the lyophilized substance. In some cases, the lyophilized substance and hydrating fluid may be mixed in-situ using a micro-pump, a vibrator, a moving paddle, or any other suitable mixer, as desired.

Figure 2:
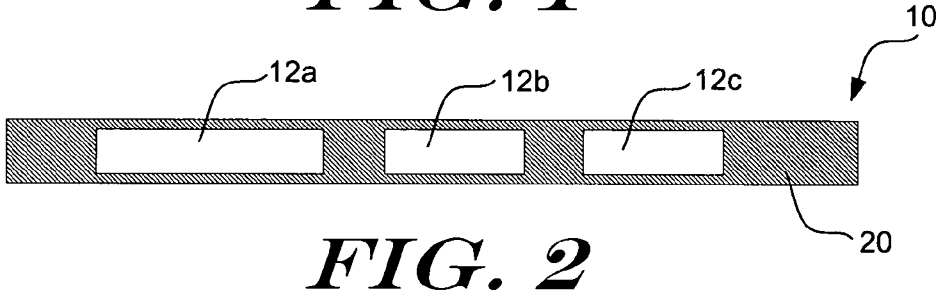
FIG. 2 is a cross-sectional side view of an illustrative embodiment of the present invention, taken along A-A of FIG. 1.

FIG. 2 is a cross-sectional side view of an illustrative embodiment of the present invention, taken along A-A of FIG. 1. In this illustrative embodiment, the microfluidic cartridge 10', or at least the portion that includes the reservoirs 12*a*', 12*b*' and 12*c*', is formed from a hydrophobic material 20 such as a polymonochlorotrifluoroethylene (PCTFE) homopolymer and/or copolymer. One particularly suitable PCTFE material is commercially available from Honeywell International under the trade name ACLAR®. While PCTFE is believed to outperform many other materials, other illustrative materials may include, for example, a Poly-Vinylidene Dichloride (PVdC) homopolymer and/or copolymer, an ethylene chlorotrifluoroethylene copolymer, an ethylene tetrafluoroethylene copolymer, a fluorinated ethylene-propylene copolymer (FEP), a perfluoroalkoxy polymer (PFA), a polyvinylidene fluoride, a polyvinyl fluoride, a polyvinylidene chloride, a tetrafluoroethylene homopolymer and/or copolymer, a hexafluoropropylene homopolymer and/or copolymer, a vinylidene fluoride homopolymer and/or copolymer, or any other suitable hydrophilic material. The reservoirs 12*a*', 12*b*' and 12*c*' may be molded, laser cut, or formed in any other suitable manner in the hydrophobic material 20, as desired.

Figure 3:
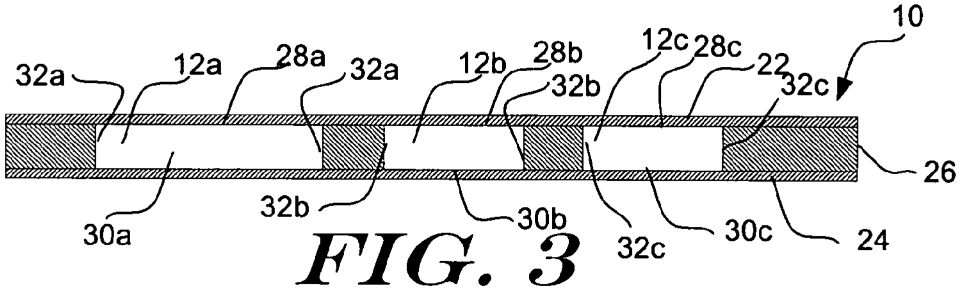
FIG. 3 is a cross-sectional side view of another illustrative embodiment of the present invention, taken along A-A of FIG. 1.

FIG. 3 is a cross-sectional side view of another illustrative embodiment of the present invention, taken along A-A of FIG. 1. In this illustrative embodiment, the microfluidic cartridge 10", or at least the portion that includes the reservoirs 12*a*", 12*b*" and 12*c*", may include a first layer 22, a second layer 24 and one or more intermediate layers 26. In the illustrative embodiment, the one or more intermediate layers 26 each include three apertures extending therethrough, which define the side walls of the reservoirs 12*a*", 12*b*" and 12*c*". In the illustrative embodiment, the first layer 22, the one or more intermediate layers 26 and the second layer 24 are laminated together, but other suitable joining techniques may also be used, if desired.

In the illustrative embodiment, the first layer 22 has inner surfaces 28*a*, 28*b*, and 28*c* facing the reservoirs 12*a*", 12*b*" and 12*c*", respectively. In some embodiments, at least one of the inner surfaces 28*a*, 28*b*, and 28*c* includes a hydrophobic material, such as a Polymonochlorotrifluoroethylene (PCTFE) homopolymer and/or copolymer. In some embodiments, the entire first layer 22 is formed from a hydrophobic material, while in other embodiments, at least one of the inner surfaces 28*a*, 28*b*, and 28*c* is coated with hydrophobic material. This may help reduce leaching, evaporation, diffusion and/or other transfer of the reagent or one of its components from the corresponding reservoir. When the reagent or the like is lyophilized, the hydrophobic material may help keep water, water vapor and/or other gases or liquids from entering the corresponding reservoir prior to use of the microfluidic cartridge 10".

Likewise, and in the illustrative embodiment, the second layer 24 has inner surfaces 30*a*, 30*b*, and 30*c* facing the reservoirs 12*a*", 12*b*" and 12*c*", respectively. Like above, and in some embodiments, at least one of the inner surfaces 30*a*, 30*b*, and 30*c* includes a hydrophobic material, such as a Polymonochlorotrifluoroethylene (PCTFE) homopolymer and/or copolymer. In some embodiments, the entire second layer 24 is formed from a hydrophobic material, while in other embodiments, at least one of the inner surfaces 30*a*, 30*b*, and 30*c* is coated with hydrophobic material. Again, this may further help reduce leaching, evaporation, diffusion and/or other transfer of the reagent or one of its components from the corresponding reservoir. When the reagent or the like is lyophilized, the hydrophobic material may help keep water, water vapor and/or other gases or liquids from entering the corresponding reservoir prior to use of the microfluidic cartridge 10".

As noted above, and in the illustrative embodiment, the one or more intermediate layers 26 each include three apertures extending therethrough, which define the side walls of the reservoirs 12*a*", 12*b*" and 12*c*". It is contemplated that, in some embodiments, at least some of the side walls 32*a*, 32*b* and 32*c* may includes a hydrophobic material, such as a Polymonochlorotrifluoroethylene (PCTFE) homopolymer and/or copolymer. In some embodiments, each of the one or more intermediate layers 26 is formed from a hydrophobic material, while in other embodiments, at least some of the side walls 32*a*, 32*b* and 32*c* are merely coated with hydrophobic material. The use of a hydrophobic material may further help reduce leaching, evaporation, diffusion and/or other transfer of the reagent or one of its components from the corresponding reservoir. When the reagent or the like is lyophilized, the hydrophobic material may also help keep water, water vapor and/or other gases or liquids from entering the corresponding reservoir prior to use of the microfluidic cartridge 10".

Figure 4:
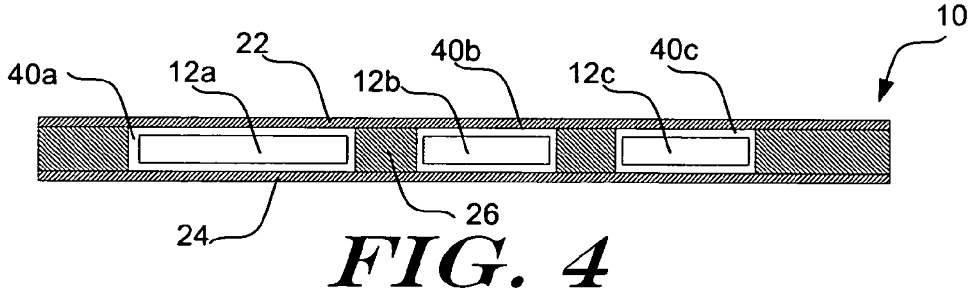
FIG. 4 is a cross-sectional side view of yet another illustrative embodiment of the present invention, taken along A-A of FIG. 1.

FIG. 4 is a cross-sectional side view of yet another illustrative embodiment of the present invention, again taken along A-A of FIG. 1. This illustrative embodiment is similar to that shown and described with respect to FIG. 3. However, at least some of the reservoirs includes a hydrophobic material 40*a*, 40*b* and 40*c* on or adjacent to at least some of the walls that defined the reservoirs 12*a*''', 12*b*''', and 12*c*'''. In some embodiments, the hydrophobic material 40*a*, 40*b* and 40*c* may be a coating that is applied on or adjacent to the walls that define at least selected reservoirs 12*a*''', 12*b*''', and 12*c*'''.

In other embodiments, the hydrophobic material 40*a*, 40*b* and 40*c* may be provided in the form of an insert that is inserted into each of at least selected reservoirs 12*a*''', 12*b*''', and 12*c*'''. The inserts maybe adapted to store one or more reagent and/or other substances, and may be formed from, or coated with, a hydrophobic material such as a Polymonochlorotrifluoroethylene (PCTFE) homopolymer and/or copolymer.

In some embodiments, the inserts 40*a*, 40*b* and 40*c* are formed separately from the remainder of the fluidic cartridge 10''', and provided in the appropriate reservoirs 12*a*''', 12*b*''', and 12*c*''' before the first layer 22 is assembled with the second layer 24 and the one or more intermediate layers 26. The inserts 40*a*, 40*b* and 40*c* may include the desired reagent or other substance before they are inserted into the corresponding reservoirs 12*a*''', 12*b*''', and 12*c*'''. Alternatively, the inserts 40*a*, 40*b* and 40*c* may be filled after they are inserted into the corresponding reservoirs 12*a*''', 12*b*''', and 12*c*'''. In some cases, the inserts 40*a*, 40*b* and 40*c* are heated so they accept the shape of the corresponding reservoirs 12*a*''', 12*b*''', and 12*c*'''. The inserts may include an access channel or opening that, when opened, is in fluid communication with the corresponding channel 14*a*, 14*b* and 14*c*, as desired.

Figure 5:
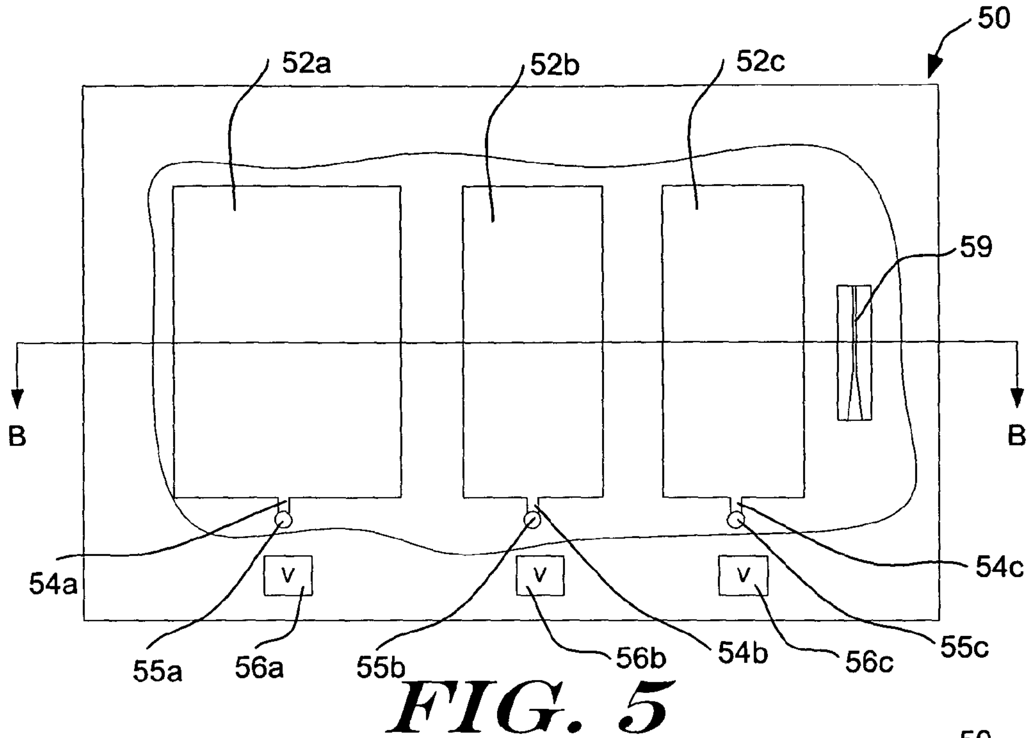
FIG. 5 is a schematic top side view of another illustrative microfluidic cartridge in accordance with the present invention.

FIG. 5 is a schematic top side view of another illustrative microfluidic cartridge 50 in accordance with the present invention. This illustrative embodiment is similar to that shown in FIG. 1, but further includes a number of thin laminated layers that are adapted to form at least part of a microfluidic circuit. It should be understood that the microfluidic cartridge 50 is only illustrative, and that the present invention can be applied to any microfluidic cartridge regardless of form, function or configuration. The illustrative microfluidic cartridge 50 may be made from any suitable material or material system including, for example, glass, silicon, one or more polymers or polymer layers, or any other suitable material or material system, or combination of materials or material systems, as desired.

Like above, the illustrative microfluidic cartridge 50 includes three reservoirs 52*a*, 52*b*, and 52*c*. At least one of the reservoirs 52*a*, 52*b* and 52*c* may be adapted to accept and store a substance or material, such as a sample, a reagent, or any other suitable substance, for an extended period of time. The sample may be, for example, a blood sample. The reagent may be, for example, a lysing agent, a sheath fluid or any other suitable reagent or substance in liquid, gas or solid form, as desired.

In the illustrative embodiment, each reservoir 52*a*, 52*b* and 52*c* includes a channel 54*a*, 54*b* and 54*c*, respectively. The channels 54*a*, 54*b* and 54*c* may be used to deliver the sample, reagent, and/or any other suitable substance from the corresponding reservoirs 52*a*, 52*b* and 52*c* to a fluidic circuit or the like on the microfluidic cartridge 50. In the illustrative embodiment, the channels 54*a*, 54*b* and 54*c* are fluidly connected to downward extending ports 55*a*, 55*b*, and 55*c*, respectively, which delivery the fluid down to one or more micro channels in a fluidic circuit formed in or on one or more thin laminated layers (see below).

The fluidic circuit may be used to perform, for example, desired material analysis and/or manipulation functions, such as chemical, biological and/or physical analyses, including in some cases, cytometry. In some cases, and as shown in the illustrative embodiment of FIG. 5, one or more valves 56*a*, 56*b* and 56*c* may also be provided to help control the flow from at least some of the reservoir 52*a*, 52*b* and 52*c* to portions of the fluidic circuit.

In accordance with the illustrative embodiment, one or more of the reservoirs 52*a*, 52*b* and 52*c* may be adapted to store a reagent or other substance for an extended period of time, thus increasing the shelf life of the microfluidic cartridge 50. In one illustrative embodiment, this may be accomplished by making at least part of a wall of at least one of the reservoirs 52*a*, 52*b* and 52*c* from a hydrophobic material, such as a polymonochlorotrifluoroethylene (PCTFE) homopolymer and/or copolymer. The hydrophobic material may help reduce leaching, evaporation, diffusion and/or other transfer of the reagent or other substance, or one of its components, from the reservoir. When the reagent or other substance is lyophilized, the hydrophobic material may help keep water, water vapor and/or other gases or liquids from entering the reservoir prior to use of the microfluidic cartridge 50.

In some systems, such as flow cytometry systems, a fluid driving system drives a sample fluid and a number of supporting fluids or reagents from one or more of the reservoirs 52*a*, 52*b* and 52*c* into the fluidic circuit. The fluidic circuit may, for example, arrange the particles into single file, typically using hydrodynamic focusing. In accordance therewith, the illustrative microfluidic cartridge 50 shown in FIG. 5 shows a focusing channel 59 in one or more of the thin laminated layers. The focusing channel 59 may be used to perform this hydrodynamic focusing.

Figure 6:
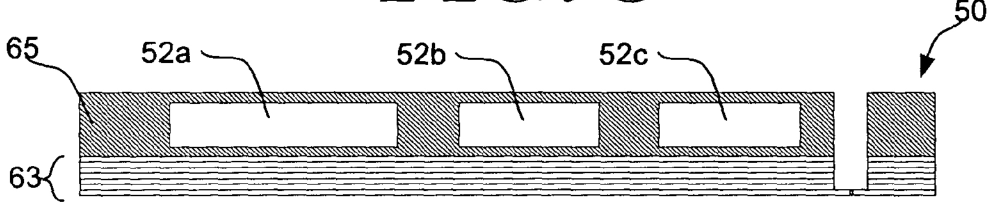
FIG. 6 is a cross-sectional side view of an illustrative embodiment of the present invention, taken along B-B of FIG. 5.

FIG. 6 is a cross-sectional side view of an illustrative embodiment of the present invention, taken along B-B of FIG. 5. This illustrative embodiment is similar to that shown in FIG. 2, but further includes a number of thin laminated layers 63 that are adapted to form at least part of a microfluidic circuit. In the illustrative embodiment, there are seven (7) polymer sheets or layers laminated together to form thin laminated layers 63. In the illustrative embodiment, each layer or sheet has a relatively controlled thickness of about 25 microns, and is patterned with apertures, slots or other shapes extending therethrough. Collectively, the seven (7) polymer sheets are pattered to form at least part of a desired microfluidic circuit. While seven (7) laminated polymer sheets or layers are shown in FIG. 6, it is contemplated that any number of layers or sheets made from any suitable material may be used, as desired.

In the illustrative embodiment, a thicker layer, with a less precise thickness is used to form the reservoirs 52*a*, 52*b* and 52*c*. In the illustrative embodiment, a reservoir forming layer 65 with a thickness of 3-4 mils is provided, and is adhered to the thin laminated layers 63. The reservoirs 52*a*', 52*b*' and 52*c*' may be molded, laser cut, or formed in any other suitable manner in the reservoir forming layer 65, as desired.

In this illustrative embodiment, the reservoir forming layer 65, or at least the portion that includes the reservoirs 52*a*', 52*b*' and 52*c*', is formed from a hydrophobic material 20 such as a polymonochlorotrifluoroethylene (PCTFE) homopolymer and/or copolymer. While PCTFE is believed to outperform many other materials, other illustrative materials may include, for example, a Poly-Vinylidene Dichloride (PVdC) homopolymer and/or copolymer, an ethylene chlorotrifluoroethylene copolymer, an ethylene tetrafluoroethylene copolymer, a fluorinated ethylene-propylene copolymer (FEP), a perfluoroalkoxy polymer (PFA), a polyvinylidene fluoride, a polyvinyl fluoride, a polyvinylidene chloride, a tetrafluoroethylene homopolymer and/or copolymer, a hexafluoropropylene homopolymer and/or copolymer, a vinylidene fluoride homopolymer and/or copolymer, or any other suitable hydrophilic material.

Figure 7:
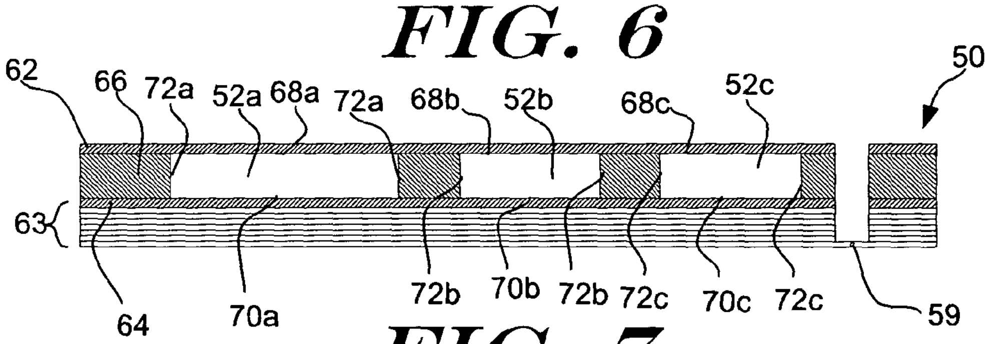
FIG. 7 is a cross-sectional side view of another illustrative embodiment of the present invention, taken along B-B of FIG. 5.

FIG. 7 is a cross-sectional side view of another illustrative embodiment of the present invention, taken along B-B of FIG. 5. This illustrative embodiment is similar to that shown in FIG. 3, but like FIG. 6, further includes a number of thin laminated layers 63' that are adapted to form at least part of a microfluidic circuit. In one illustrative embodiment, there are seven (7) polymer sheets or layers laminated together to form thin laminated layers 63'. In the illustrative embodiment, each sheet has a relatively controlled thickness of about 25 microns, and is patterned with apertures, slots or other shapes extending therethrough. Collectively, the seven (7) polymer sheets are pattered to form a desired microfluidic circuit. While seven (7) laminated polymer sheets or layers are shown in FIG. 7, it is contemplated that any number of layers or sheets made from any suitable material may be used, as desired.

In the illustrative embodiment of FIG. 7, the microfluidic cartridge 50", or at least the portion that includes the reservoirs 52*a*", 52*b*" and 52*c*", includes a first layer 62, a second layer 64 and one or more intermediate layers 66. In the illustrative embodiment, the one or more intermediate layers 66 includes three apertures extending therethrough, which define the side boundaries of the reservoirs 52*a*", 52*b*" and 52*c*". The first layer 62, the one or more intermediate layers 66 and the second layer 64 are stacked and secured together such that the apertures in the one or more intermediate layers 66, the first layer 62 and the second layer 64 at least substantially defined the reservoirs 52*a*", 52*b*" and 52*c*", as shown. In some embodiments, the first layer 62, the one or more intermediate layers 66 and the second layer 64 are laminated together, but other suitable joining techniques may also be used, if desired.

In the illustrative embodiment, the first layer 62 has inner surfaces 68*a*, 68*b*, and 68*c* facing reservoirs 52*a*", 52*b*" and 52*c*", respectively. In some embodiments, at least one of the inner surfaces 68*a*, 68*b*, and 68*c* includes a hydrophobic material, such as a Polymonochlorotrifluoroethylene (PCTFE) homopolymer and/or copolymer. In some embodiments, the entire first layer 62 is formed from a hydrophobic material, while in other embodiments, at least one of the inner surfaces 68*a*, 68*b*, and 68*c* is coated with hydrophobic material. This may help reduce leaching, evaporation, diffusion and/or other transfer of the reagent or one of its components from the corresponding reservoir. When the reagent or the like is lyophilized, the hydrophobic material may help keep water, water vapor and/or other gases or liquids from entering the corresponding reservoir prior to use of the microfluidic cartridge 50".

Likewise, the second layer 64 may have inner surfaces 70*a*, 70*b*, and 70*c* facing reservoirs 52*a*", 52*b*" and 52*c*", respectively. Like above, and in some embodiments, at least one of the inner surfaces 70*a*, 70*b*, and 70*c* includes a hydrophobic material, such as a Polymonochlorotrifluoroethylene (PCTFE) homopolymer and/or copolymer. In some embodiments, the entire second layer 64 is formed from a hydrophobic material, while in other embodiments, at least one of the inner surfaces 70*a*, 70*b*, and 70*c* is coated with hydrophobic material. Again, this may further help reduce leaching, evaporation, diffusion and/or other transfer of the reagent or one of its components from the corresponding reservoir. When the reagent or the like is lyophilized, the hydrophobic material may help keep water, water vapor and/or other gases or liquids from entering the corresponding reservoir prior to use of the microfluidic cartridge 50".

As noted above, and in the illustrative embodiment, the one or more intermediate layers 66 include three apertures extending therethrough, which define the side walls of the reservoirs 52*a*", 52*b*" and 52*c*". It is contemplated that, in some embodiments, at least some of the side walls 72*a*, 72*b* and 72*c* include a hydrophobic material, such as a Polymonochlorotrifluoroethylene (PCTFE) homopolymer and/or copolymer. In some embodiments, each of the one or more intermediate layers 66 is formed from a hydrophobic material, while in other embodiments, at least part of the side walls 72*a*, 72*b* and 72*c* is coated with hydrophobic material. This may further help reduce leaching, evaporation, diffusion and/or other transfer of the reagent or one of its components from the corresponding reservoir. When the reagent or the like is lyophilized, the hydrophobic material may also help keep water, water vapor and/or other gases or liquids from entering the corresponding reservoir prior to use of the microfluidic cartridge 50".

Figure 8:
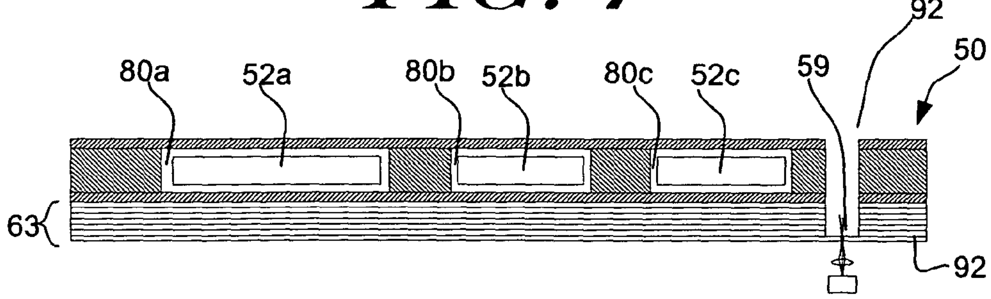
FIG. 8 is a cross-sectional side view of yet another illustrative embodiment of the present invention, taken along B-B of FIG. 5.

FIG. 8 is a cross-sectional side view of yet another illustrative embodiment of the present invention, taken along B-B of FIG. 5. This illustrative embodiment is similar to that shown and described with respect to FIG. 7. However, at least some of the reservoirs 52*a*''', 52*b*''' and 52*c*''' include a hydrophobic material 80*a*, 80*b* and 80*c* on or adjacent to at least some of the side walls that defined the reservoirs 52*a*''', 52*b*''', and 52*c*'''. In some embodiments, the hydrophobic material 80*a*, 80*b* and 80*c* may be a coating that is applied on or adjacent to the inner walls that define at least selected reservoirs 52*a*''', 52*b*''', and 52*c*'''.

In other embodiments, the hydrophobic material 80*a*, 80*b* and 80*c* may be provided in the form of inserts that are inserted into at least selected reservoirs 52*a*''', 52*b*''', and 52*c*'''. The inserts may be adapted to store one or more reagent and/or other substances, and may be formed from, or coated with, a hydrophobic material such as a Polymonochlorotrifluoroethylene (PCTFE) homopolymer and/or copolymer.

In some embodiments, the inserts 80*a*, 80*b* and 80*c* are formed separately from the remainder of the fluidic cartridge 50''', and provided in the appropriate reservoirs 52*a*''', 52*b*''', and 52*c*''' before the first layer 62 is assembled with the second layer 64 and the one or more intermediate layers 66. The inserts 80*a*, 80*b* and 80*c* may include the desired reagent or other substance before they are inserted into the corresponding reservoirs 52*a*''', 52*b*''', and 52*c*'''. Alternatively, the inserts 80*a*, 80*b* and 80*c* may be filled after they are provided in the corresponding reservoirs 52*a*''', 52*b*''', and 52*c*'''. In some cases, the inserts 80*a*, 80*b* and 80*c* are heated so they accept the shape of the corresponding reservoirs 52*a*''', 52*b*''', and 52*c*''', and/or may be in the form of blister packs. The inserts may include or be adapted to include an access channel or opening that, when opened, is in fluid communication with the corresponding channel 54*a*, 54*b* and 54*c*, if desired.

As shown in FIGS. 5-8, the illustrative microfluidic cartridge 50 may include a focusing channel 59 in one or more of the thin laminated layers 63 to perform hydrodynamic focusing. Referring to FIG. 8, the focusing channel 59 is situated in or between one or more of the thin laminated layers 63". In the illustrative embodiment, the focusing channel 59 is provided in layer 90 (see FIG. 8). One or more of the adjacent layers may include an aperture therethrough to collectively form an opening 92 above (and in some cases below) the focusing channel 59.

A light source and associated optics generally shown at 94 may be positioned adjacent to the one or more thin laminated layers 63", as shown. Because the one or more thin laminated layers 63 may have relatively controlled thicknesses, the vertical position of the focusing channel 59 to the light source 94 can be controlled. This may help the light source and associated optics 94 focus the light onto the focusing channel 59, if desired. In the illustrative embodiment, one or more light detectors (and sometimes associated optics) may be positioned above the focusing channel 59 to receive light signals, sometimes including light scatter, through the focusing channel 59. This may help identify certain characteristics of the material flowing through the focusing channel 59.

Figure 9:
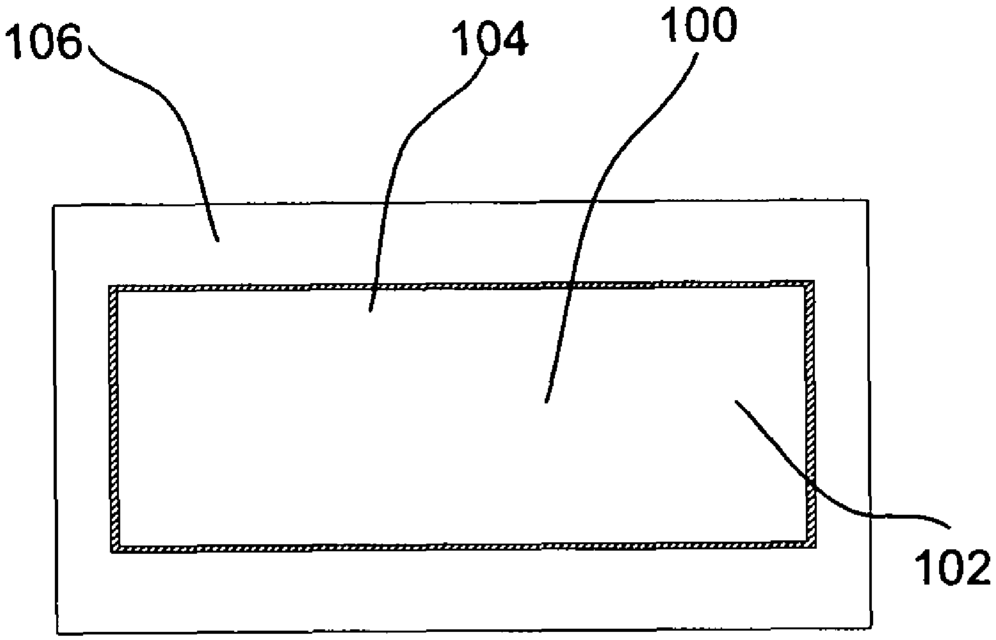
FIG. 9 is a schematic cross-sectional side view of an illustrative reservoir in accordance with the present invention.

FIG. 9 is a schematic cross-sectional side view of an illustrative reservoir in accordance with the present invention. In this illustrative embodiment, a reservoir 100 is defined by an inner first material 102, an outer second material 106 and an intermediate third material 104. The inner surface of the reservoir 100 is defined by the inner first material 102. In some embodiments, the inner first material 102 may be a hydrophobic material such as a Polymonochlorotrifluoroethylene (PCTFE) homopolymer and/or copolymer. In these embodiments, the outer second material 106 and the intermediate third material 104 need not be a hydrophobic material. In other embodiments, the intermediate third material 104 may be a hydrophobic material such as a Polymonochlorotrifluoroethylene (PCTFE) homopolymer and/or copolymer, and the inner first material 102 and the outer second material 106 need not be a hydrophobic material. In some cases, the outer second material 106 and an intermediate third material 104 may be a common layer made from a common material.

Having thus described the preferred embodiments of the present invention, those of skill in the art will readily appreciate that the teachings found herein may be applied to yet other embodiments within the scope of the claims hereto attached.

What is claimed is:

1. A micro-fluidic cartridge comprising:

at least two reservoirs, each defined or substantially defined by two or more reservoir walls, wherein at least a majority of the two or more reservoir walls of each of the at least two reservoirs includes a hydrophobic material;

wherein a first of the at least two reservoirs includes a lysing agent; and wherein a second of the at least two reservoirs includes a sheath agent, wherein at least the first and second reservoirs are sealed to store the lysing agent and sheath fluid prior to use of the cartridge.

2. The micro-fluidic cartridge of claim 1 wherein a third of the at least two reservoirs is adapted to include a collected sample.

3. The micro-fluidic cartridge of claim 1 wherein the hydrophobic material includes a Polymonochlorotrifluoroethylene (PCTFE) homopolymer and/or copolymer.

* * * * *